United States Patent
Steckenborn et al.

(10) Patent No.: US 12,123,604 B2
(45) Date of Patent: Oct. 22, 2024

(54) ADDITIONAL CONTROL DEVICE, VENTILATION ASSEMBLY, VENTILATION SYSTEM, OPERATING METHOD FOR AN ADDITIONAL CONTROL DEVICE, COMPUTER PROGRAM PRODUCT

(71) Applicant: LUNOS Lüftungstechnik GmbH & Co. KG für Raumluftsysteme, Berlin (DE)

(72) Inventors: Michael Steckenborn, Schönefeld (DE); Michael Merscher, Falkensee (DE)

(73) Assignee: LUNOS LÜFTUNGSTECHNIK GMBH & CO. KG FÜR RAUMLUFTSYSTEME, Berlin (DE)

( * ) Notice: Subject to any disclaimer, the term of this patent is extended or adjusted under 35 U.S.C. 154(b) by 927 days.

(21) Appl. No.: 17/258,653

(22) PCT Filed: Jul. 18, 2019

(86) PCT No.: PCT/EP2019/069348
§ 371 (c)(1),
(2) Date: Jan. 7, 2021

(87) PCT Pub. No.: WO2020/016349
PCT Pub. Date: Jan. 23, 2020

(65) Prior Publication Data
US 2021/0270478 A1 Sep. 2, 2021

(30) Foreign Application Priority Data
Jul. 19, 2018 (DE) .................... 10 2018 117 514.0

(51) Int. Cl.
*F24F 11/00* (2018.01)
*F24F 11/63* (2018.01)
(Continued)

(52) U.S. Cl.
CPC .......... *F24F 11/0001* (2013.01); *F24F 11/63* (2018.01); *F24F 11/77* (2018.01);
(Continued)

(58) Field of Classification Search
CPC ......... F24F 11/0001; F24F 11/63; F24F 11/77
See application file for complete search history.

(56) References Cited

U.S. PATENT DOCUMENTS

| 5,559,407 A | 9/1996 | Dudley et al. |
| 2003/0011984 A1 | 1/2003 | Chu et al. |

(Continued)

FOREIGN PATENT DOCUMENTS

| DE | 602 10 580 T2 | 2/2007 |
| DE | 102014201343 A1 | 7/2015 |

(Continued)

OTHER PUBLICATIONS

PCT International Search Report and Written Opinion mailed Oct. 21, 2019 in corresponding Application No. PCT/EP2019/069348, 11 pages.

(Continued)

*Primary Examiner* — Mark A Connolly
(74) *Attorney, Agent, or Firm* — Ware, Fressola, Maguire & Barber LLP (57) ABSTRACT

The present invention has an additional control device for locally adapting a control signal to be fed to a device-external ventilator having a supply input, a supply output to provide a ventilator supply voltage to the device-external ventilator, a control input, which is configured to receive an actual control signal to be fed to the external ventilator, which actual control signal specifies a desired delivery rate to the ventilator, a control unit with a delivery rate determining unit to capture a power measurement variable correlating with an actual delivery rate of the ventilator, a (Continued)

control signal adapting unit to determine a desired control signal, and a power control unit to output either the received actual control signal or the desired control signal at a control output to the external ventilator in dependence on the result of the comparison.

14 Claims, 4 Drawing Sheets

(51) Int. Cl.
*F24F 11/77* (2018.01)
*F24F 11/88* (2018.01)
*F24F 110/30* (2018.01)
*F24F 110/40* (2018.01)

(52) U.S. Cl.
CPC ....... *F24F 2011/0002* (2013.01); *F24F 11/88* (2018.01); *F24F 2110/30* (2018.01); *F24F 2110/40* (2018.01)

(56) References Cited

U.S. PATENT DOCUMENTS

| 2013/0218347 | A1 | 8/2013 | Jung et al. |
| 2019/0017724 | A1* | 1/2019 | Sekar ................. F24F 13/1426 |
| 2019/0024929 | A1* | 1/2019 | Funada ................... F24F 11/89 |
| 2021/0236979 | A1* | 8/2021 | Pham .................... B01D 46/444 |

FOREIGN PATENT DOCUMENTS

| DE | 102014211416 A1 | 12/2015 |
| EP | 3182607 A1 | 6/2017 |

OTHER PUBLICATIONS

Office Action dated Apr. 4, 2019 issued by the German Patent Office in corresponding Application No. DE 10 2018 117 514.0, 5 pages.

* cited by examiner

ADDITIONAL CONTROL DEVICE, VENTILATION ASSEMBLY, VENTILATION SYSTEM, OPERATING METHOD FOR AN ADDITIONAL CONTROL DEVICE, COMPUTER PROGRAM PRODUCT

CROSS REFERENCE TO RELATED APPLICATIONS

This application is the U.S. National Stage of International Application No. PCT/EP2019/069348 filed on Jul. 18, 2019, which application claims priority under 35 USC § 119 to German Patent Application No. 10 2018 117 514.0 filed on Jul. 19, 2018, both of which are hereby incorporated by reference in their entirety.

TECHNICAL FIELD

The invention relates to an additional control device for locally adapting a control signal to be fed to an external ventilator. The invention relates further to a ventilator, a ventilation system, a method of operating an additional control device, and a computer program product.

BACKGROUND OF THE INVENTION

Decentralized ventilation systems, respectively comprising one or more ventilators in the rooms to be ventilated, are used for the ventilation of rooms, in particular in apartments or houses. Depending on the type, the ventilators use their fan to transport the supply air and/or the exhaust air for ventilating the respective room. Either radial fans or axial fans|[ES1] are used as fans.

From the user's point of view the provision of a central control device that, for example, specifies the desired or required delivery volume in the air exchange, is desirable also in case of such decentralized ventilation systems with individually operated ventilators. Such a control option makes it possible to switch the ventilators on and off as needed, or to control the delivery rate or delivery direction. Such a control device and a plurality of decentralized ventilators controlled by it lead to a star topology.

When it comes to the transport of supply and exhaust air, it is desirable to achieve a delivery volume flow that is as constant as possible and corresponds to a specified desired delivery volume flow. Under reference conditions, this is relatively easy to achieve, if the fan of the ventilator is controlled by means of a control signal, such as a control voltage or a pulse width modulated control signal, in order to achieve a certain fan speed. Thus, the ventilator can be controlled to achieve a desired delivery volume flow via the relationship-which is determined either by way of experiments or by way of calculations-between a certain fan speed and a delivery volume flow achieved at said fan speed.

To this end, the control device in a first alternative embodiment may feed the same control signal to each ventilator of the ventilation system. Such a control solution that is kept relatively simple and therefore requires particularly little technical effort has proven to be sufficient in numerous applications. However, in practice, the problem with this approach is that individual disturbances may affect a respective ventilator, causing a deviation from the reference conditions. The wind acting on the exterior wall of a house, for example, might cause an increased counter-pressure that counteracts the delivery volume flow to be delivered by the respective ventilator in a ventilator that works through this exterior wall. If the counter-pressure increases, the engine driving the ventilator will, at a certain operating point, no longer be able to maintain the specified delivery volume flow, causing the delivery volume flow to decrease. At the same time, the pressure conditions at the other exterior walls of the house may, due to the wind direction present at the respective point in time, be entirely different and not impact the delivery volume flow of the ventilators arranged at those other exterior walls.

In a second alternative embodiment of the control device, the control device feeds a first control signal only to a first subset of the ventilators of the ventilation system, and feeds a second control signal, that is specifically generated for said second subset of ventilators of the ventilation system, to a second subset of ventilators of the ventilation system, wherein the first and second control signal are simultaneously supplied to the respective subset of fans and are coordinated with each other such that the interaction between a ventilator of the first subset and a ventilator of the second subset generates the desired air flow in a respective room. Thus, the first and second control signal are usually synchronized in this embodiment.

Accordingly, it would be desirable to be able to keep a specified delivery volume flow during the operation of the ventilator as constant as possible despite changes in the counter-pressure.

Another type of ventilators that has been developed is ventilators with an additional pressure sensor system, by means of which a counter-pressure acting on the ventilator can be measured, and a connected control device, so that the ventilator can be adjusted based on the measured counter-pressure. However, such ventilators entail increased equipment expenditure, which makes them unattractive from a cost point of view and, moreover, leads to increased maintenance and repair costs and efforts. On the market, there is little interest in such systems.

SUMMARY OF THE INVENTION

For these reasons, it is desirable to provide an improved option for controlling a constant volume flow for an individual ventilator in a ventilation system.

According to a first aspect, the present invention relates to an additional control device for locally adapting a control signal to be fed to a device-external ventilator, comprising:
 a supply input, to which a ventilator supply voltage can be supplied;
 a supply output, which is configured to provide the supplied ventilator supply voltage to the device-external ventilator;
 a control input, which is configured to receive from a device-external control device an actual control signal to be fed to the external ventilator, which actual control signal specifies a desired delivery rate to the ventilator;
 a control unit, which is connected to the control input and to the supply input, uses the ventilator supply voltage for the power supply of the control unit, and has:
 a delivery rate determining unit, which is configured to capture a power measurement variable correlating with an actual delivery rate of the ventilator;
 a control signal adapting unit, which is configured to determine a desired control signal in dependence on the received actual control signal and the captured power measurement variable and to compare said desired control signal with the received actual control signal;
 a power control unit, which is configured to output either the received actual control signal or the desired control signal at a control output to the external ventilator in dependence on the result of the comparison.

The present invention is based on the realization that, in a ventilation system with a plurality of ventilators, it is necessary to control each ventilator in such a way that the ventilator delivers a constant delivery volume flow, i.e., has a constant actual delivery rate, while equipment expenditure is kept relatively small. The invention is based on the solution approach of the ability to equip a traditional ventilator as needed in the individual case with an additional control device, by means of which the delivery volume flow consistency can be controlled for the respective ventilator with little effort and cost, and, in particular, without the need of additional sensors. Such a control system can also be added later on, after the installation and commissioning of the ventilator.

To this end, the additional control device according to the invention provides a control input, which is configured to receive from a device-external control device an actual control signal to be fed to the external ventilator, which actual control signal specifies a desired delivery rate to the ventilator. Such a device-external control device is typically a central control device, that controls the operation of a plurality of ventilation devices.

Furthermore, the additional control device according to the invention has a delivery rate determining unit, which is configured to capture a power measurement variable correlating with an actual delivery rate of the ventilator.

Thus, using these input variables, the external control device acts as a central provider of desired values for a control signal. The external control device can be configured in a particularly simple manner and without complicated wiring requirements, in particular without connections for a return line from the ventilator to the control device.

The subsequent installation of the additional control device or the equipment of the ventilator with the additional control device by the manufacturer makes it possible to control a ventilator individually, as the additional control device captures a power measurement variable of the individual ventilator and determines a desired control signal for the respective ventilator in dependence on this power measurement variable and the actual control signal and feeds it to the ventilator.

Thus, if a decrease in the power measurement variable is detected, the control signal for the respective ventilator can be adapted independently of the control of the other ventilators in the system in such a way that the power measurement variable—and therefore the actual delivery volume flow of the ventilator—is brought back into the desired range.

By means of such an optional, individual decentralized control, each ventilator can—despite different ventilator-specific counter-pressures—be controlled such that a constant delivery volume flow, i.e., a constant actual delivery rate, of the ventilator is maintained, without this plurality of individual control processes requiring the use of the external, central control device of the ventilation system.

In the following, exemplary embodiments of the control device according to the invention are described.

In preferred embodiments, the delivery rate determining unit has an ammeter connected in series between the supply input and the supply output, which is configured to capture an electric current flowing between the supply input and the supply output during the operation of the ventilator as the power measurement variable. This process may specifically mean that the additional control device is—in addition to its connection to the control line—connected between a supply line and a supply connection of the ventilator, and is thus able to measure an electrical power received by the ventilator. The reason why this is possible is that, if the supply voltage is approximately constant, the power can be measured by means of a measurement of the electric current flowing through the supply line. The ammeter may for example be configured as a current flow sensor. This makes it possible to capture a power measurement variable that correlates with the actual delivery rate of the ventilator without the need of an additional sensor. The actual delivery rate corresponds to an actual delivery volume flow moved by the ventilator, which also takes into account the counter-pressure. This means that it is, in particular, possible to retrofit an additional control device with relatively little installation effort, since the supply line and the control line can be interrupted at one point and the additional control device can be connected at this point. At this interface, the power measurement variable can be measured-namely at the supply line—and the desired control signal can be fed to the ventilator for controlling purposes as well—namely via the control line. In preferred embodiments, the additional control device is inserted into an existing plug connection for retrofitting purposes, wherein previously, i.e., before the retrofitting, the plug connection connected the ventilator to the supply line and/or the control line.

The additional control unit is also supplied via the supply line of the ventilator. This has the advantage that no additional connecting line is required and that the effort and costs of the installation can be reduced. Due to its functions, the additional control device has a low power consumption. Despite the fact that this power consumption of the control device is included in the current measurement and therefore in the determination of the power measurement variable, it can be disregarded as a disturbance variable. The power consumption of the additional control device is approximately 10 times lower than the power consumption of the ventilator. Furthermore, it can be assumed due to the continuously executed computing operations of the additional control device that the power consumption of the additional control device is constant. Consequently, the power consumption of the control device can be removed from the result of the measurement with relatively small effort, for example through the subtraction of a constant value from the measurement result.

In one embodiment, the delivery rate determining unit has—in addition—a pressure sensor, that is configured to measure a pressure signal as the power measurement variable, wherein said signal correlates with a counter-pressure counteracting a delivery volume flow of the ventilator, and wherein the control signal adapting unit is configured to determine the desired control signal solely—or, if the delivery rate determining unit has, as explained above, an ammeter connected in series between the supply input and the supply output, in addition—in dependence on the pressure signal as the captured power measurement variable. Such an embodiment is based on the realization that the counter-pressure constitutes the essential disturbance variable when it comes to controlling the ventilator such that a desired delivery volume flow is achieved. The measurement of the counter-pressure by means of one or several pressure sensors at the ventilator, makes it possible to capture this disturbance variable and to use it for the determination of the delivery volume flow. The counter-pressure is the static pressure difference between the side in front of the ventilator and the side behind the ventilator, and may, for example, be caused by wind acting on a building from the outside or by negative pressure acting inside a building.

In one embodiment, the delivery rate determining unit is, in addition, supplied with a speed signal of a fan of the external ventilator and the delivery rate determining unit is configured to unambiguously assign the power measurement variable to a delivery volume flow using the speed signal, and the control signal adapting unit is configured to determine the desired control signal in addition in dependence on the speed signal and the measured current as the captured power measurement variable. In such an embodiment, the ventilator speed, i.e., the speed of the fan of the ventilator, is used for an improved approximate determination of the delivery volume flow delivered by the fan. If both the power consumed by the ventilator and the current speed are known, a current operating point of the ventilator can be determined-unambiguously, in particular. If the delivery volume flow is determined solely based on the electrical power consumed by the ventilator, a case in which several operating points of the ventilator can be considered for a measurement value may occur.

Thus, a ventilator might consume the same amount of electrical power at an operating point at low speed and high counter-pressure as it consumes at an operating point at a higher speed and lower counter-pressure. Such ambiguity can be reduced, and, in particular, be excluded, through the measurement of the ventilator speed.

One embodiment provides for an additional control device with a characteristic curve memory that contains a plurality of characteristic curve fields of the external ventilator, each of which indicates a dependency between the power measurement variable and the delivery volume flow, and for a control signal adapting unit that is configured to determine the desired control signal on the basis of at least one characteristic curve field. Such characteristic curve fields make it possible to approximately determine a corresponding current delivery volume flow for an operating point of the ventilator, which is described by the power measurement variable. A plurality of characteristic curve fields, for example for different ventilator types, can be stored and selected in the characteristic curve memory.

One embodiment provides for an additional control device with a function module comprising at least one mathematical function, wherein the at least one mathematical function describes a dependency between a counter-pressure counteracting the delivery volume flow of the ventilator and the delivery volume flow.

One embodiment requires that the control signal adapting unit further comprises a parameterization switch that is configured to set at least one characteristic curve field from a set of characteristic curve fields. Such a parameterization switch has the advantage that it can be used to select a device type corresponding to the ventilator for which the additional control device is installed, during the installation of the additional control device. Thus, the installer can select the device type during the installation. The parameterization switch can be configured as a rotary switch, that can, in particular, be operated by means of a screw driver or by hand. In this case, a selection can be made by moving the rotary switch into a rotary position that corresponds to the desired device type. The parameterization switch can also be configured as an arrangement of a pin header and one or more jumpers. In this case, the device type can be selected via a certain arrangement of the jumpers on the pin header. Another embodiment uses a so-called DIP (dual in-line package) switch. By means of a combination of several of these switches or different switch positions, a large amount of information can be encoded in a small space. Advantageously, this allows for more settings than, for example, in case of a rotary switch or a jumper.

In an alternative embodiment, the control signal adapting unit has a user interface, via which information on a device type may be entered and which is configured to select at least one characteristic curve field from a set of characteristic curve fields in accordance with the information on the device type. In this embodiment, a parametrization in accordance with the device type can thus also be performed without a switch and be, for example, set by the installer via a mobile device. Furthermore, the control signal adapting unit may have a user interface via which the at least one characteristic curve field from a set of characteristic curve fields can be set in accordance with a device type, for example via an external computer.

One embodiment provides for a control signal that is configured as a voltage signal or as a pulse width modulated signal. In both cases, the control signal indicates a desired value, in particular a speed, for an internal ventilator control and/or for the engine of a ventilator. In embodiments where the control signal is configured as a voltage signal, a voltage signal proportional to the desired value describes this relationship. In embodiments, where the control signal is configured as a pulse-width modulated signal, the desired value is encoded in the form of a pulse width.

A second aspect of the invention relates to a ventilation assembly with a ventilator that comprises a control signal input for receiving a control signal and a fan controllable by means of the control signal, wherein the ventilation assembly comprises in addition an additional control device according to the first aspect of the invention or one of its embodiments, which is connected in-or outside the ventilator upstream the controllable fan or the control signal input.

The ventilation assembly offers the same advantages that were described in connection with the additional control device above.

Due to the fact that, in order to control the ventilator in dependence on the captured power measurement variable, the actual control signal is merely converted into the desired control signal, the additional control device can advantageously be configured as a retrofittable module in case of such a ventilation assembly, said module having suitable connections, for example for a plug connection, for a simple, subsequent installation in the control path between the external control device and a control input of the respective ventilator. This means that the additional control device can be retrofitted with relatively little cost and effort.

In other embodiments of the ventilation assembly, the additional control device is already integrated into a ventilator by the manufacturer. In this case, a housing might even be omitted and the connections can correspondingly be configured as simple connections, especially since the connection to the control input of the ventilator can, for example, be created through soldering, and since the additional control device is already sufficiently protected by a housing of the ventilator.

A third aspect of the invention relates to a ventilation system comprising: at least a ventilation assembly according to the second aspect of the invention or one of its embodiments, and a control device providing the actual control signal to the at least one ventilation assembly.

A fourth aspect of the invention relates to an operating method for an additional control device for locally adapting a control signal to be fed to a device-external ventilator, comprising the steps of:

receiving a ventilator supply voltage;

supplying the ventilator supply voltage to the device-external ventilator;

receiving from a device-external control device an actual control signal to be fed to the external ventilator, which actual control signal specifies a desired delivery rate to the ventilator;

capturing a power measurement variable correlating with an actual delivery rate of the ventilator;

determining a desired control signal in dependence on the received actual control signal and the captured power measurement variable;

comparing the desired control signal with the actual control signal;

outputting the received actual control signal or the desired control signal to the device-external ventilator in dependence on the result of the comparison.

A fifth aspect of the invention relates to a computer program product that contains executable program code for controlling the execution of an operating method by a programmable processor device of an additional control device.

BRIEF DESCRIPTION OF THE DRAWINGS

In the following, further exemplary embodiments of the invention will be described based on the enclosed drawings. The following is shown in FIG. 1 an additional control device in a schematic circuit diagram, FIG. 2 a possible structure of a ventilation assembly, FIG. 3 a schematic characteristic curve of a characteristic curve field, FIG. 4 a structure of a ventilation system in a building, FIG. 5 another embodiment of a ventilation assembly, FIG. 6A, 6B respectively one embodiment of a parameterization switch.

DETAILED DESCRIPTION

Figure 1:
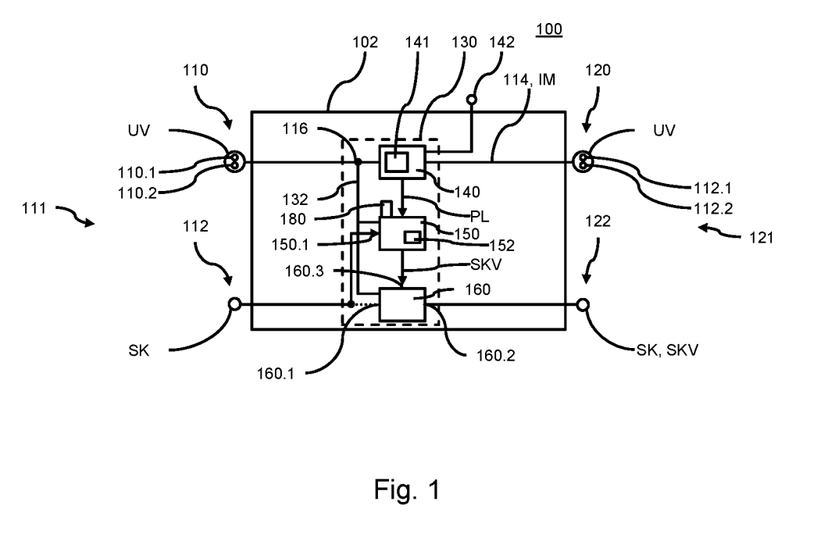

FIG. 1 shows an additional control device 100 according to the concept of the invention. On an input side 111, the additional control device 100 has a supply input 110 with a positive input connection 110.1 and a negative input connection 110.2. Furthermore, the additional control device 100 has a control input 112 on its input side 111. On an output side 121, the additional control device 100 has a positive output connection 120.1 and a negative output connection 120.2 at a supply output 120. Furthermore, the additional control device 100 has a control output 122 on its output side 121.

The additional control device 100 has a connection 110.1, 110.2, 112 arranged on the input side 111, which is respectively assigned to a connection 120.1, 120.2, 122 arranged on the output side and can be connected to a ventilator 800, that comprises, in particular, its own, internal ventilator control 810. The additional control device 100 can be connected between a supply line 802 and the internal ventilator control 810 and thus be retrofitted to a ventilator 800 in an advantageous manner with relatively little effort.

The additional control device 100 comprises a housing 102 that protects the components of the additional control device 100 in a suitable manner and shields them from environmental influences such as moisture and dust. The housing 102 may for example be made of plastic or of metal, in particular of stainless metal. The connections 110, 112, 120, 122 can be configured as plugs, binding posts or a comparable electrical contact, in order to allow for a reliable and relatively simple installation. The connections 110, 112 may be combined into a three-pole input plug-in module. Analogously, the connections 120, 122 may be combined into a output plug-in module.

There are embodiments where the connections 110, 112, 120, 122 may be enclosed by the housing 102, wherein in this case the housing can be opened at least partially in the area of the connections 110, 112, 120, 122 for installation purposes. In such embodiments, the area of the connections 110, 112, 120, 122 is also advantageously protected from environmental influences.

In the present case, the additional control device 100 is supplied with a supply voltage UV at the positive input connection 110.1 and the negative input connection 110.2 via the supply line 802 and with a control signal SK at the control input 112. In this case, the positive input connection 110.1 is connected to the positive output connection 120.1 and the negative input connection 110.2 to the negative output connection 120.2 in such a way that the supply voltage UV is supplied at the output 120 of the additional control device 100.

The additional control device 100 comprises a control unit 130 that is connected to the supply input 110 and the control input 112. The control unit 130 comprises a delivery rate determining unit 140, a control signal adapting unit 150 and a power control unit 160.

In the present case, the delivery rate determining unit 140 has an ammeter 141 that is configured to measure a current IM flowing in a main line 114 between the supply input 110 and the supply output 120. In the present case, the measured current IM is used as the power measurement variable PL, which correlates approximately with a delivery volume flow VF of the ventilator 800.

The delivery rate determining unit 140 is connected to the control signal adapting unit 150, so that the power measurement variable PL is transmitted to the control signal adapting unit 150. The purpose of the control signal adapting unit 150 is to generate a desired control signal SKV. The generation is performed in dependence on the power measurement variable PL, for example by means of the generation of a control voltage US or a pulse width modulated signal PWM in dependence on the power measurement variable PL. Furthermore, the desired control signal SKV can be generated by means of the multiplication of the actual control signal SK by a variable factor that depends on the power measurement variable PL. In this case, a desired control signal SKV is not newly generated, but the actual control signal SK is adapted for the determination of the desired SKV signal, instead.

The desired control signal is generated based on the realization that, in case of a constant supply voltage UV, the measured current IM is proportional to the electrical power PO consumed by the ventilator 800 at the output 120. The information on the consumed electrical power PO allows for an approximate allocation to a delivery volume flow VF delivered by the ventilator 800. In case of a relatively high measured current IM, it is assumed that the delivery volume flow VF delivered is relatively high; on the other hand, it is assumed that the measured current IM is relatively low, if the measured current IM is relatively low.

The relationship between the power measurement variable PL and the delivery volume flow VF can be described by means of a characteristic curve field KP. The control signal adapting unit 150 comprises a characteristic curve memory 152, in which one or more characteristic curve fields KP can be stored and be made available as needed.

Furthermore, the control signal adapting unit 150 comprises a parameterization switch 180, by means of which a characteristic curve field KP can be selected from the set KPG of the characteristic curve fields KP. The selection of a characteristic curve field KP makes it possible to adapt the additional control device 100—in particular during its installation—to a specific device type of a ventilator 800.

The desired control signal SKV is supplied via a power control adjustment input 160.3 of the power control unit 160. The power control unit 160 transmits the desired control signal SKV via a power control output 160.2 to the control output 122. In preferred embodiments, the power control unit 160 is configured to transmit the desired control signal to the control output 142 only if it deviates by more than a specified amount from the actual control signal SK. If the deviation is smaller than said amount, only the actual control signal SK, that can be supplied to the power control unit 160 via a power control input 160.1, will be transmitted to the power control output 160.2 and thus to the control output 122.

The components of the control unit 130 are supplied with electrical energy via the main line 114. To this end, a supply branch 132 is connected to the main line 114 via a branch node 116. The supply branch 132 is connected to both the control signal adapting unit 150 and the power control unit 160 for electricity supply purposes. The energy consumption of the additional control device 100 therefore influences the determination of the power measurement variable PL on the basis of the measured current IM. However, compared to the power consumption of the ventilator 800, the power consumption of the additional control device 100 is low. Moreover, the power consumption of the additional control device 100 is relatively constant, which means that it can be mathematically removed form the result of the current measurement with relatively little effort.

The ventilator 800 is controlled by means of the additional control device 100 via the setting of the desired control signal SKV, namely in dependence on the power consumption of the ventilator 800, i.e., the electrical power PO, that the ventilator 800 obtains via the output 120 of the additional control device 100.

In preferred embodiments, the delivery rate determining unit 140 may comprise a sensor input 142. As an alternative or in addition to the ammeter 141 of the delivery rate determining unit 140, this sensor input 142 can be used to capture measurement values for the determination of the power measurement variable PL. The speed N of the ventilator 800, in particular, can be provided via the sensor input 142. To this end, the sensor input 142 can be connected to a position or speed sensor (which is not shown in the figure). In some embodiments, it is possible to read the speed N directly from the engine of the ventilator.

Figure 2:
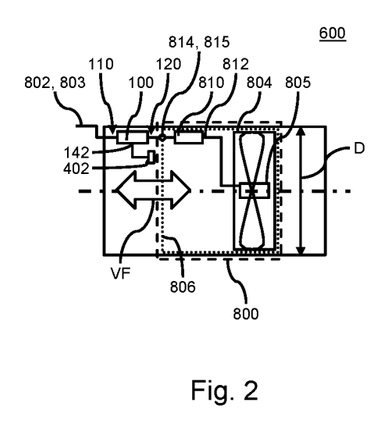

Furthermore, a pressure sensor 402—as shown in FIG. 2—can be connected to the sensor input 142. The pressure sensor 402 can be used to measure the counter-pressure PG acting at the ventilator 800. The counter-pressure PG can be used for a better approximate determination of the delivery volume flow VF, in particular since the estimate of the delivery volume flow is not solely based on the electrical output power PO.

FIG. 2 schematically shows a possible structure of a ventilation assembly 600 comprising a ventilator 800 and an additional control device 100. The ventilator 800 has a ventilator housing 806, which, in the present case, is formed by a pipe section, the diameter D of which approximately corresponds to the diameter of the ventilation pipe, to which the ventilator 800 is connected.

A fan 804 that is arranged coaxially to the pipe-shaped ventilator housing 806 is arranged inside the ventilator housing 806. Furthermore, the ventilator comprises an internal control 810, that supplies and controls an engine 805 of the fan 804 via an electrical fan line 812. The engine 805 is preferably configured as an EC engine. The internal ventilator control 810 is not directly connected to a supply line 802: instead, the additional control device 100 is inserted and connected between the supply line 802 and the internal ventilator control 810. In preferable embodiments, the additional control device 100 is configured such that it allows for easy retrofitting, i.e., a subsequent installation in the ventilator 800 with relatively little effort. Such an ability to be retrofitted is, in particular, achieved through standardized plug connections at the inputs 110, 112 and at the outputs 120, 122, which are, in particular, compatible with an already existing plug connection between the supply line 802 and the internal control 810.

In preferred embodiments of the invention, it is also possible that the ventilator 800 does not have an internal control 810, and that the additional control device 100 thus controls the fan 804 directly, as the output 120 is directly connected to the fan line 812.

Figure 3:
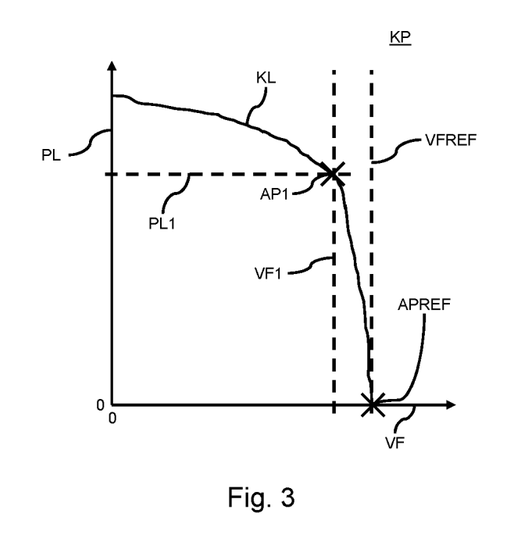

FIG. 3 schematically shows a characteristic curve KL of a characteristic curve field KP. The characteristic curve KL describes the relationship between a delivery volume flow VF and a power measurement variable PL at a constant ventilator speed N. Under reference conditions, i.e., in particular, if a counter-pressure PG acting against the delivery volume flow VF is zero, the power measurement variable PL will also be zero. In this case, the delivery volume flow VF will have a maximum reference value VFREF at a reference operating point APREF. If the counter-pressure PG increases, the power consumption of the ventilator 800 will increase at the same time. This means that the electrical power PO required for keeping the ventilator 800 at the constant ventilator speed N under increasing counter-pressure PG will increase. Consequently, the measured current IM and therefore the power measurement variable PL will increase as well. A first power measurement variable PL1 is measured at a first operating point AP1 shown in this figure. According to the characteristic curve KL, the delivery volume flow has the value VF1, which is consequently smaller than the value VFREF. Thus, the delivery volume flow rate VF can be approximately determined by means of the power measurement variable PL.

Figure 4:
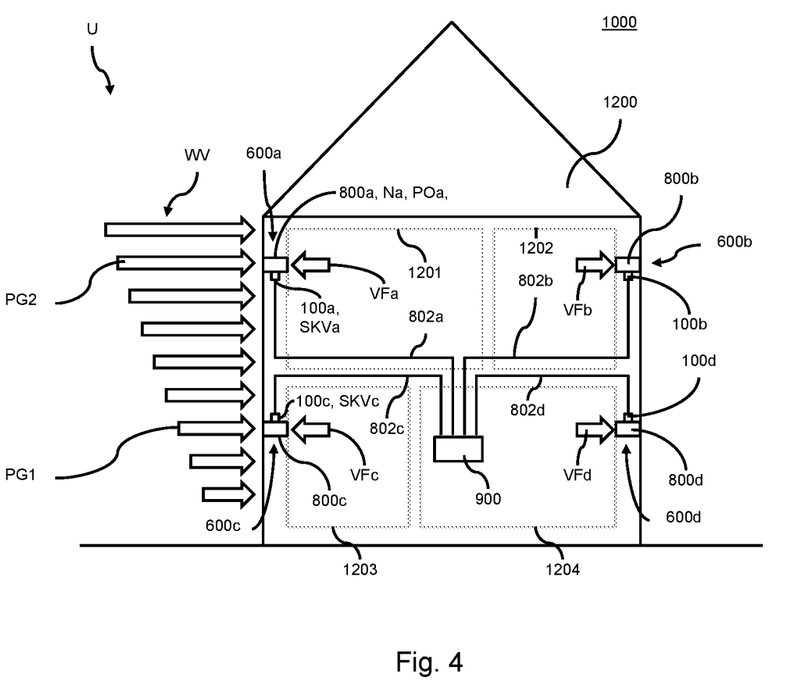

FIG. 4 schematically shows the structure of a ventilation system 1000 in a building 1200. The building has four rooms 1201, 1202, 1203, 1204. By way of example, a ventilation assembly 600a-d with respectively one ventilator 800a-d is assigned to each room 1201-1204 in the present case; this assignment is only an example—it is, for example, also possible to assign several ventilators to one room.

The four ventilation assemblies 600a-d each comprise an additional control device 100a-d according to the concept of the invention. The four additional control devices 100a-d are connected to an external control device 900. The control of the ventilators 800a-d by means of the respectively assigned additional control device 100a-d ensures that a predefined volume flow VFa-d is delivered at all times, in particular independently of a counter-pressure PG acting on the respective ventilator 800a-d. Thus, this control is preferably configured in a decentralized manner, since the external control device 900 merely specifies a desired state for each individual ventilator 800a-d; in the simplest case, this may be the state "on" or "of", or a control signal SK determined for a specific desired delivery volume VFSOLL. The control of each individual ventilator is performed by the additional control device 100*a-d* assigned to the respective ventilator 800*a-d*. Thus, each ventilator 800*a-d* is controlled in accordance with the ambient conditions at the respective ventilator, in particular in accordance with the counter-pressure PG at the respective ventilator 800*a-d*.

In the present case, a first ventilator 800*a* is arranged in the exterior wall of the building 1200 between the environment U and the first room 1201. The first ventilator 800*a* comprises an additional control device 100*a*, that is connected to the central control 900 via a first supply line 802*a*.

Due to the weather conditions, a wind distribution WV is present, which acts on the building 1200 and which is stronger in the top area than in the bottom area, close to the ground. As a result, a second counter-pressure PG2 acting on the first ventilator 800*a*, that is arranged higher up, is higher than a first counter pressure PG1, that acts on a third ventilator 800*c* arranged further down.

The control is performed in a decentralized manner by the respective additional control device 100*a*, 100*c*, in accordance with the concept of the invention. Thus, due to the counter-pressure PG2, a high electrical output power POa of the first ventilator 800*a* is required for maintaining a constant first ventilator speed Na of the first ventilator 800*a*. This increased power demand is measured via the delivery rate determining unit 140, which is not illustrated in more detail in this figure. Based on the measurement, the delivery rate determining unit generates a first desired control signal SKVa, which is, in turn, transmitted to a first power control unit 150*a*. The first power control unit 150*a* transmits the first desired control signal SKVa to the first ventilator 800*a*, in order to increase the delivery rate of the ventilator 800*a*. This adaptation process is repeated in the way of a control loop, until a first electrical output power POa of the first ventilator 800*a* which corresponds to the first desired delivery volume flow VFa is measured.

If it is now assumed that, in terms of the absolute value, the first delivery volume flow VFa and the third delivery volume flow VFc have the same desired value VFSOLL and that both air volume flows VFa, VFc are—for example by means of a pendulum ventilation method—guided out of the building 1200, a first desired control signal SKVa of the first ventilator 800*a* must, due to the higher counter-pressure PG2, be set to a higher value than a third desired control signal SKVc of the third ventilator 800*c*.

Figure 5:
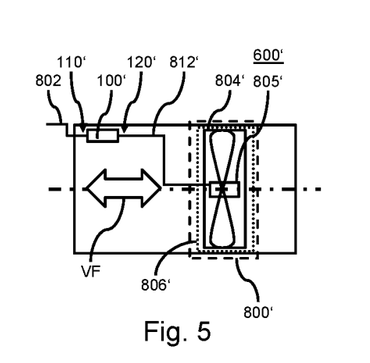

FIG. 5 shows an embodiment of a ventilator 800' with a ventilator housing 806', which does not comprise an internal fan control 810. Instead, an additional control device 100' is connected directly to an engine 805' of a fan 804' via a fan line 812'. In this embodiment, the additional control device 100' therefore directly controls the fan 804' and thus performs the function of the internal ventilator control 810.

Figure 6A:
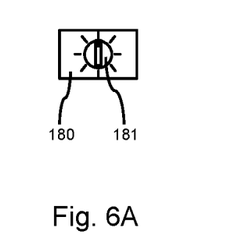
Figure 6B:
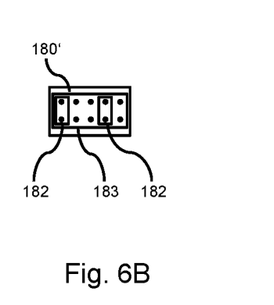

FIGS. 6A and 6B each show an advantageous embodiment of a parameterization switch 180, 180'. FIG. 6A shows a parameterization switch 180 with a selector switch 181. The parameterization switch 180 can be used to select device- or type-specific settings for one or more suitable characteristic curve fields KP, for example by means of a screw driver via a selector switch 181 at the parameterization switch 180. Depending on the position into which the selector switch 181 is rotated, a specific model of the ventilator 800 can be selected. The parameterization switch 180 can be arranged in such a way that it is accessible from the outside of a housing 102, that is not shown in this figure. Alternatively, the parameterization switch can be integrated into the housing 102, so that the housing 102 must be opened for parameterization, in particular for the installation of the additional control device 100. The parameterization switch 180 makes it possible to adapt the additional control device 100, in particular if it is being retrofitted, to a specific model of the ventilator 800 with relatively little effort.

As an alternative to a rotary switch, a parameterization 180' may—as shown in FIG. 6B—also comprise an arrangement of one or more jumpers 182, which are plugged into an electronic pin header 183. Thus, depending on the arrangement of the jumpers, one or more characteristic curve fields KP can be selected for a specific model of the ventilator 800. By means of one or more jumpers 182, an additional control device 100 can advantageously be set to a relatively large number of options.

LIST OF REFERENCE NUMBERS 100, 100*a-d*, 100' additional control device
102 housing
110 supply input
110.1 positive input connection
110.2 negative input connection
111 input side
112 control input
114 main line
116 branch node
120 supply output
120.1 positive output connection
120.2 negative output connection
121 output side
122 control output
130 control unit
132 supply branch
140 delivery rate determining unit
141 ammeter
142 sensor input
150 control signal adapting unit
152 characteristic curve memory
160 power control unit
160.1 power control input
160.2 power control output
160.3 power control adjustment input
180, 180' parameterization switch
181 selector switch
182 jumper
183 pin header
400 sensor
402 pressure sensor
600, 600*a-d*, 600' ventilation assembly
700 power supply
710 higher-level control
800, 800*a-d*, 800' ventilator
802 supply line
803 control line
804, 804' fan
805, 805' engine
806, 806' ventilator housing
810 internal ventilator control
812, 812' fan line
814 supply input
815 control input
900 central control
1000 ventilation system
D diameter of the ventilator housing
IM measured current
KP characteristic curve field
KPG set of characteristic curve fields
N, Na, Nc ventilator speed PF delivery rate of the ventilator
PL power parameters, power parameter correlating with the delivery rate of the ventilator
PO, POa, POc electrical output power, power consumed by the ventilator
PG1, PG2 first, second counter-pressure
PP pressure signal
SK actual control signal
SKV, SKVa-d desired control signal
U environment
US control voltage
UV supply voltage
VF, delivery volume flow
VFa-d
VFSOLL desired delivery volume flow value
WV wind distribution

What is claimed is:

1. An additional control device for locally adapting a control signal to be fed to a device-external ventilator comprising:
    a supply input, to which a ventilator supply voltage can be supplied;
    a supply output, which is configured to provide the supplied ventilator supply voltage to the device-external ventilator;
    a control input, which is configured to receive from a device-external control device an actual control signal to be fed to the external ventilator, which actual control signal specifies a desired delivery rate to the ventilator; and
    a control unit, which is connected to the control input and to the supply input, uses the ventilator supply voltage for the power supply of the control unit, and comprises:
        a delivery rate determining unit, which is configured to capture a power measurement variable correlating with an actual delivery rate of the ventilator;
        a control signal adapting unit, which is configured to determine a desired control signal in dependence on the received actual control signal and the captured power measurement variable and to compare said desired control signal with the received actual control signal; and
        a power control unit, which is configured to output either the received actual control signal or the desired control signal at a control output to the external ventilator in dependence on the result of the comparison.

2. The additional control device according to claim 1, wherein the delivery rate determining unit has an ammeter connected in series between the supply input and the supply output, which is configured to capture an electric current flowing between the supply input and the supply output during the operation of the ventilator as the power measurement variable.

3. The additional control device according to claim 2, where
    the delivery rate determining unit comprises in addition a pressure sensor, which is configured to measure a pressure signal as the power measurement variable, which correlates with a counter-pressure counteracting the delivery volume flow of the ventilator, and where
    the control signal adapting unit is configured to determine the desired control signal in dependence on the pressure signal as the captured power measurement variable.

4. The additional control device according to claim 3, where
    the delivery rate determining unit is, in addition, supplied with a speed signal of a fan of the external ventilator and where the delivery rate determining unit is configured to unambiguously assign the power measurement variable to a delivery volume flow using the speed signal, and where
    the control signal adapting unit is configured to determine the desired control signal in addition in dependence on the speed signal and the measured current as the captured power measurement variable.

5. The additional control device according to claim 1, comprising a characteristic curve memory containing a plurality of characteristic curve fields of the external ventilator, which respectively indicate a dependency between the power measurement variable and the delivery volume flow, and where
    the control signal adapting unit is configured to determine the desired control signal on the basis of at least one characteristic curve field.

6. The additional control device according to claim 5, wherein the control signal adapting unit further comprises a parameterization switch that is configured to set at least one characteristic curve field from a set of characteristic curve fields.

7. The additional control device according to claim 1, with a function module comprising at least one mathematical function, wherein the at least one mathematical function describes a dependency between a counter-pressure counteracting the delivery volume flow of the ventilator and the delivery volume flow.

8. The additional control device according to claim 1, wherein the control signal is configured as a voltage signal or as a pulse width modulated signal.

9. The additional control device according to claim 1, where
    the delivery rate determining unit comprises in addition a pressure sensor, which is configured to measure a pressure signal as the power measurement variable, which correlates with a counter-pressure counteracting the delivery volume flow of the ventilator, and where
    the control signal adapting unit is configured to determine the desired control signal solely in dependence on the pressure signal as the captured power measurement variable.

10. The additional control device according to claim 1, where
    the delivery rate determining unit is, in addition, supplied with a speed signal of a fan of the external ventilator and where the delivery rate determining unit is configured to unambiguously assign the power measurement variable to a delivery volume flow using the speed signal, and where
    the control signal adapting unit is configured to determine the desired control signal in addition in dependence on the speed signal and the measured current as the captured power measurement variable.

11. A ventilation assembly with
    a ventilator comprising a control signal input for receiving a control signal and a fan controllable by means of the control signal, wherein
    the ventilation assembly comprises in addition an additional control device according to claim 1, which is connected in-or outside the ventilator upstream the controllable fan or the control signal input.

12. A ventilation system, comprising:
    at least one ventilation assembly according to claim 11, and a control device supplying the actual control signal to the at least one ventilation assembly.

13. An operating method for an additional control device for locally adapting a control signal to be fed to a device-external ventilator, comprising the steps of:

receiving a ventilator supply voltage;

supplying the ventilator supply voltage to the device-external ventilator;

receiving from a device-external control device an actual control signal to be fed to the external ventilator, which actual control signal specifies a desired delivery rate to the ventilator;

capturing a power measurement variable correlating with an actual delivery rate of the ventilator;

determining a desired control signal in dependence on the received actual control signal and the captured power measurement variable;

comparing the desired control signal with the actual control signal; and outputting the received actual control signal or the desired control signal to the device-external ventilator in dependence on the result of the comparison.

14. A non-transitory computer readable medium comprising executable program code for controlling the execution of a method according to claim 13 by a programmable processor device of an additional control device.

* * * * *